Patented Mar. 4, 1947

2,416,878

UNITED STATES PATENT OFFICE 2,416,878

CURING HALOGEN CONTAINING LINEAR POLYMERS

Richard Vernon Lindsey, Jr., and Samuel Le Roy Scott, Wilmington, Del., assignors to E. I. du Pont de Nemours & Company, Wilmington, Del., a corporation of Delaware No Drawing. Application August 20, 1943, Serial No. 499,388

2 Claims. (Cl. 260—79)

This invention relates to a process for curing halogen containing polymers of monoethylenic vinyl and vinylidene compounds.

The uses to which many of the halogen-containing polymers of monoethylenic vinyl and vinylidene compounds can be put are limited by their low softening points and poor resistance to many organic solvents. Although methods are available whereby these properties can be improved with certain polymers, the methods are not wholly satisfactory. The desirability, therefore, of developing a more successful process was apparent, which process should be applicable to a wide variety of halogen-containing polymeric materials and which would consistently produce products of uniform quality and improved properties.

An object of the present invention is to provide an improved process for curing halogen-containing polymers of monoethylenic vinyl and vinylidene compounds. Another object is to improve the softening point and solvent resistance of these polymers. Yet another object is to provide conditions under which the curing can be conducted to give uniform products. Other objects and advantages of the invention will hereinafter appear.

The invention involves the process of curing halogen-containing linear polymers of monoethylenic vinyl and vinylidene compounds wherein the halogen is attached to an intralinear carbon, i. e., a carbon which is part of the linear polymeric chain, by compounding the same with sulfur, a rubber accelerator and a group II metal oxide and heating for at least fifteen minutes at a temperature of at least 100° C. The invention more especially relates to effecting the curing in accord with the above procedure by a process in which the sulfur therefor is furnished solely by the accelerator.

The term "curing" means that changes are produced in the polymer which result in improved properties, particularly in the increase in solvent resistance and increase in temperature at which the material becomes tacky. Many of the cured products have rubber-like properties and it is accordingly logical to assume that "curing" is somewhat analogous to vulcanization, although in the problem solved by this invention no lessons could be drawn from the vulcanization of rubber since, in contradistinction to rubber, the polymers of monoethylene compounds are essentially free from unsaturation. Since, in order to provide these improved properties, it has been found that the presence of a basic ingredient is apparently essential, the assumption can be made that the curing reaction involves the removal of halogen resulting directly in, or followed by, a cross linking reaction. This can be pictured in several ways:

(1) Direct removal of halogen from adjacent polymer chains with the formation of a connecting bond (Wurtz' reaction);

(2) Similar to (1) with the formation of a sulfur bond between the chains; and (3) Removal of hydrogen halide to produce unsaturation, followed by curing which would be similar to the vulcanization of rubber.

It is to be understood that these theoretical considerations of the chemical mechanism of the process do not limit the scope of the invention or restrict the claims in any way. They are given primarily to aid the skilled chemist in a better understanding of the invention.

Generally the curing process is conducted by thoroughly mixing the polymeric material and the desired amounts of the compounding ingredients on heated mill rolls by methods well known in the art. The roll temperatures may vary between 60 and 140° C. depending inter alia on the amount of plasticizer, if one is used, and the particular polymer employed. The milled product is then cured by heating at a temperature of at least 100° C. for at least 15 minutes. Shaped articles can be prepared if desired by molding and curing the product under pressure.

Preferred embodiments of the invention are illustrated in the examples, in which parts are by weight unless otherwise indicated. From these examples, it will be found that the process is applicable to a variety of chlorine-containing polymers of monoethylenic vinyl and vinylidene compounds (Examples 1, 3, 4 and 5), variations in the type and amount of accelerator employed (Examples 1, 2, and 6), and a choice in Group II metallic oxide (Examples 1 and 6). Examples 3, 4, and 5 represent the use of accelerators wherein the sulfur therefor is provided entirely by the accelerator. It will also be noted that plasticizers may be varied in type and amount (Examples 1 and 3) or may be entirely eliminated (Examples 2, 5 and 6).

*Example 1.*—A mixture comprising the following ingredients: 24 parts of an interpolymer of vinyl chloride (95%) and vinyl acetate (5%) (a commercial product known as "Vinylite VYNW") 9.6 parts of di-(butyl Cellosolve) sebacate (the sebacate of ethylene glycol monobutyl ether) 0.48 part sulfur, 0.48 part of a condensation product of butyraldehyde and aniline (sold commercially as "Accelerator 808"), and 0.48 part magnesium oxide is milled on standard mill rolls at a temperature of 80-100° C. until homogeneous. The compounded material is then cured in molds by heating for 50 minutes at 150° C. under 7,000 lbs. initial pressure.

The cured stock is tough, pliable, and non-thermoplastic. It is swelled but not dissolved by common solvents and has a tensile strength of 3270 lbs./sq. in. and an elongation of 180% at break.

*Example 2.*—A composition comprising the following ingredients is prepared by milling at a temperature of 100-120° C. and then cured as described in Example 1: 12 parts "Vinylite VYNW," 0.24 part sulfur, 0.12 part 2-mercaptothiazoline, and 0.6 part zinc oxide. The cured stock resembles hard rubber. It is non-thermoplastic and shows great resistance to common solvents.

*Example 3.*—The following composition is prepared and cured in the manner described in Example 1: 12 parts polyvinyl chloride, 6 parts di(butyl Cellosolve) sebacate, 3.0 parts carbon black, 0.96 part dipentamethylenethiuram tetrasulfide (an accelerator sold commercially as "Tetrone" A), and 0.8 part zinc oxide. The cured stock is tough and rubber-like and has a tensile strength of 1770 lbs./sq. in., and an elongation of 104% at break.

*Example 4.*—In the manner of the foregoing example, stock is prepared of the following composition: 12 parts of after-chlorinated polyvinyl chloride, 6 parts di(butyl Cellosolve) sebacate, 3 parts carbon black, 0.96 part dipentamethylenethiuram tetrasulfide, and 0.8 part zinc oxide. The cured stock is pliable, non-thermoplastic, and solvent resistant. It has a tensile strength of 1610 lbs./sq. in. and an elongation of 100% at break.

*Example 5.*—Ethylene/vinyl chloride interpolymer is prepared in the following manner.

A stainless-steel lined reaction vessel is charged with 200 parts of water, 400 parts of vinyl chloride, and 0.64 part of benzoyl peroxide. The pH of this mixture is adjusted to 3.0 with dilute formic acid. The vessel is closed, evacuated, placed in a rocker mechanism, pressured with ethylene, and heating and agitation are started. During a reaction time of 14.75 hours, throughout which the temperature is maintained at 74-77° C., and the pressure at 860-985 atms., there is a total observed pressure drop of 165 atms. The vessel is cooled, bled of excess ethylene, opened, and the contents distilled. The polymer is freed of unreacted monomers by steam distillation, then separated from the water present and dried on a rubber mill. There is thus obtained 194 parts of an ethylene/vinyl chloride interpolymer, which has an intrinsic viscosity of 0.38 (as measured on a 0.25% solution in xylene at 85° C.) and which contains 39.95% chlorine. From this chlorine content it may be calculated that the polymer has an ethylene/vinyl chloride mole ratio of 1:1.02.

Stock of the following composition is milled until homogeneous on standard mill rolls at 80-100° C.: 15 parts of the interpolymer, 5 parts carbon black, 1.2 parts dipentamethylenethiuram tetrasulfide, and 1.0 part zinc oxide. The compounded material is then cured in a mold by heating for 50 minutes at 150° C. under 7,000 lbs. initial pressure. The cured stock is tough, rubberlike, non-thermoplastic and shows improved solvent resistance. It has a tensile strength of 2950 lbs./sq. in. and an elongation of 296% at break.

*Example 6.*—In the manner of the foregoing example stock of the following composition is prepared and cured for one hour at 145° C.: 20 parts of an interpolymer of ethylene and vinyl chloride, 2 parts carbon black, 0.6 part sulfur, a small amount of piperidinium pentamethylenedithiocarbamate (sold commercially as "Pip-pip" or "Accelerator 552"), and 2 parts calcium oxide. The cured product is strong and elastic.

In addition to the specific polymer of the examples, any halogen-containing polymer of a monoethylene vinyl or vinylidene compound may be similarly treated. Among the suitable materials may be mentioned interpolymers of vinyl chloride and vinyl acetate containing at least 10% chlorine, i. e., about 18% vinyl chloride based on the weight of the total polymer; polymers of vinyl bromide and vinyl iodide; interpolymers of vinyl chloride with acrylic acid, esters, amides, nitrile and the like; the polymerized alpha and beta chloro- or bromo acrylic and methacrylic acids, esters, amides, nitriles and their interpolymers with other polymerizable materials; the polymerized alpha and beta chlorostyrene and bromostyrenes; the polymers of halogenated olefines where the halogen is attached to a doubly bonded carbon atom such as alphachloropropylene, beta-bromopropylene, symmetrical and unsymmetrical dichloroethylene, alpha and beta chloro- and bromo isobutylenes, etc. Interpolymers in which one of the components prior to polymerization is a halogen containing monoethylenic vinyl or vinylidene compound and the other component is a polymerizable monoethylenic compound such as ethylene, isobutylene, styrene, methyl methacrylate, acrylonitrile, etc. are particularly useful. In general, it is desirable that the polymer to be treated contain at least 10% by weight of halogen, though useful effects are obtained even with smaller amounts of halogen. The chlorine containing polymers are particularly useful.

Normal rubber accelerators may be employed and as further examples of them may be included tetraethylthiuram disulfide, zinc dibutyldithiocarbamate, mercaptobenzothiazole, diphenylguanidine, piperidinium pentamethylenedithiocarbamate, etc. In addition to zinc oxide, other Group II metal oxides may be used such, for example, as magnesium oxide, calcium oxide, and barium oxide. Various reenforcing agents or fillers may likewise be incorporated during the milling into the mixtures such, for example, as carbon blacks, clays, calcium carbonate, and blanc fixe.

Also, the choice and amounts of added ingredients is not limited to those of the specific examples. In general, sulfur may be employed in amounts ranging from 0.25-15% of the weight of the polymer but is generally preferred in amounts of 0.5-2%; accelerators are used in amounts from 0.1-15% with a preferred range of 0.25-10%, where the higher limits are reserved for those cases in which the accelerator also furnishes the sulfur; group II metal oxides are employed in amounts from 2-20% with a preferred range of 5-15%; and reenforcing agents and fillers are used in amounts up to 60% of the weight of the polymer, the preferred range being dependent upon the properties desired in the final product.

An especially important modification, as illustrated in Examples 3, 4, and 5, is the use of an accelerator of the thiuram tetrasulfide type, which liberates sulfur during the curing process and, hence, makes it unnecessary to supply additional elementary sulfur. The thiuram tetrasulfide accelerators are represented by the general formula

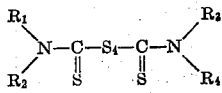

wherein the R's are hydrocarbon radicals which may be alike or different. Also, the two radicals attached to a common nitrogen atom may be joined together to form a single cyclic divalent radical, as in the case of the dipentamethylenethiuram tetrasulfide of the examples. Other examples of this class of accelerators are tetramethylthiuram tetrasulfide, tetraethylthiuram tetrasulfide, tetrabutylthiuram tetrasulfide, di(phenylmethyl)thiuram tetrasulfide, di(phenylethyl)thiuram tetrasulfide, and others such as described in U. S. 1,634,925 and 1,681,717. It is frequently desirable to add other common compounding ingredients such as antioxidants, lubricants, blowing agents when sponge-like material is desired, fillers, and the like to improve the texture and aging properties of the cured stock.

The curing process is also subject to wide variation, both in regard to time and temperature of treatment, and may be carried out in a mold, press, or in the absence of external pressure as, for example, in the preparation of spongy articles where a blowing agent is employed. In general, temperatures of 130–150° C. are employed for periods of 15–60 minutes.

The type and quantity of plasticizer are not intended to be limited by the specific examples since there may be employed any substances or combinations of substances which are known to have a pliabilizing action for the polymers employed. Examples are dibutyl phthalate, acetylated castor oil, tricresyl phosphate, etc. These plasticizers may be employed in amounts varying from 0–150% or higher of the weight of the polymer used with corresponding variations in the properties of the cured stock from soft, pliable compositions to hard and brittle substances resembling hard rubber. In general, the preferred range of plasticizer is 30–100% of the weight of the polymer. The method of adding the plasticizer may also vary since it may be conveniently added directly to the polymer as the first step in the milling operation or it may be premixed with the polymer by forming a slurry of the two ingredients in a suitable solvent and allowing the solvent to evaporate.

As a further modification in the practice of this invention, it is frequently desirable to use the chlorine-containing polymer in the form of a latex or aqueous dispersion since the materials may be more easily handled in this form for specific applications. Accelerators and other ingredients can be added to the dispersions and products formed and cured by the same general procedures used with rubber latex.

Since the products of this invention vary from soft, elastic materials to hard, horny substances resembling hard rubber, and since they can be prepared in any desired shape by molding, they are useful in numerous fields where their pliability, solvent resistance, non-thermoplasticity or rubber-like properties make them applicable. Among the uses for the pliable compositions are bathing apparel (belts, caps, capes, etc.), dental goods (dental dams), drug and surgical supplies (sheeting, tubing, teething rings, nipples, ice bags, etc.), flooring (floor mats, stair treads), footwear (rubbers, heels, taps, impregnated soles, etc.), household items (jar rings, bottle caps, buttons, coasters, fly swatters, wedges, sink stoppers, aprons, gloves, kneeling pads, ash trays, mats, plate wipers, etc.), insulated wire and cable, laboratory supplies (tubing, stoppers, aprons), latex products (can closures, jar rings, etc.), mechanical goods (belting, hose, mountings, gaskets, valve discs, rolls, washers, grommets, auto mats, pedal rubbers, tires for toys, tank linings, windshield wipers, etc.), proofed goods (auto fabrics, crib sheets, shower curtains, raincoats, etc.), sponge rubber products (arm rests, cushions, sponges, mats, toys, etc.), sporting goods (balls, surf toys, baseball plates, etc.), stationer's goods (typewriter feet, telephone bases, coin mats, cord protectors, etc.), thread, toys and novelties (dolls, molded toys, balls, dog toys, sponge novelties, etc.), vehicle accessories (top dressing, pedal pads, tires, etc.).

The hard rubber like products are useful as binders for paint brush bristles, battery cases, insulators and the like.

We claim:
1. In a process of curing an essentially saturated interpolymer of vinyl chloride and ethylene, the steps which comprise milling the interpolymer of vinyl chloride and ethylene with from 2 to 20%, based on the weight of the interpolymer, of a metal oxide of Group II and from 0.1 to 15%, based on the weight of the interpolymer, of a thiuram tetrasulfide and subsequently heating the resulting mixture for at least fifteen minutes at a temperature within the range 100° C. to 150° C.

2. In a process of curing an essentially saturated interpolymer of vinyl chloride and ethylene, the steps which comprise milling the interpolymer of vinyl chloride and ethylene with from 2% to 20%, based on the weight of the interpolymer, of zinc oxide, and from 0.1 to 15%, based on the weight of the interpolymer, of a thiuram tetrasulfide and consequently heating the resulting mixture for at least fifteen minutes at a temperature within the range 100° C. to 150° C.

RICHARD VERNON LINDSEY, Jr.
SAMUEL LE ROY SCOTT.

REFERENCES CITED

The following references are of record in the file of this patent:

UNITED STATES PATENTS

| Number | Name | Date |
| --- | --- | --- |
| 2,215,379 | Sebrell | Sept. 17, 1940 |
| 1,989,246 | Reed | Jan. 29, 1935 |
| 2,115,896 | Wiezevich | May 3, 1938 |
| 2,245,500 | Rein et al. | June 10, 1941 |
| 2,200,429 | Perrin et al. | May 14, 1940 |
| 2,259,671 | Voorhees | Oct. 21, 1941 |
| 2,274,616 | Raynolds | Feb. 24, 1942 |
| 2,175,049 | Alexander | Oct. 3, 1939 |

FOREIGN PATENTS

| Number | Country | Date |
| --- | --- | --- |
| 353,194 | British | July 24, 1931 |

OTHER REFERENCES

Brous et al., "Koroseal," article in Industrial and Engineering Chemistry, June 1935, vol. 27, pages 667–672. 260–88.

Blake and Davis, "Chemistry & Technology of Rubber," page 293, published by Reinhold, N. Y., 1937. (Copy in Div. 38.)

Lange's Handbook of Chemistry, 5th ed., 1944, Handbook Publishers, Sandusky, Ohio, page 56.